United States Patent
Kondo (10) Patent No.: US 10,239,290 B2
(45) Date of Patent: Mar. 26, 2019

(54) LAMINATED BODY, MOLDED BODY, MOLDED PRODUCT, AND METHOD FOR MANUFACTURING MOLDED PRODUCT

(71) Applicant: IDEMITSU UNITECH CO., LTD., Tokyo (JP)

(72) Inventor: Kaname Kondo, Chiba (JP)

(73) Assignee: IDEMITSU UNITECH CO., LTD., Tokyo (JP)

( * ) Notice: Subject to any disclaimer, the term of this patent is extended or adjusted under 35 U.S.C. 154(b) by 503 days.

(21) Appl. No.: 14/780,792

(22) PCT Filed: Mar. 26, 2014

(86) PCT No.: PCT/JP2014/058503
§ 371 (c)(1),
(2) Date: Sep. 28, 2015

(87) PCT Pub. No.: WO2014/157320
PCT Pub. Date: Oct. 2, 2014

(65) Prior Publication Data
US 2016/0052243 A1  Feb. 25, 2016

(30) Foreign Application Priority Data

Mar. 29, 2013 (JP) ................................. 2013-074723
Mar. 29, 2013 (JP) ................................. 2013-074763

(51) Int. Cl.
*B29D 7/01* (2006.01)
*B29C 47/00* (2006.01)
(Continued)

(52) U.S. Cl.
CPC .......... *B32B 27/08* (2013.01); *B29C 47/0021* (2013.01); *B29C 47/14* (2013.01);
(Continued)

(58) Field of Classification Search
CPC ... B32B 27/40; B32B 27/32; B32B 2307/412; B32B 2307/54; B32B 27/08
See application file for complete search history.

(56) References Cited

U.S. PATENT DOCUMENTS

| 5,876,852 A | 3/1999 | Hargarter |
| 6,333,094 B1 | 12/2001 | Schneider |

(Continued)

FOREIGN PATENT DOCUMENTS

| JP | 2000-141401 A | 5/2000 |
| JP | 2000-185383 A | 7/2000 |

(Continued)

OTHER PUBLICATIONS

Translation of JP 2001-213976. (Year: 2001).*
(Continued)

*Primary Examiner* — Catherine A. Simone
(74) *Attorney, Agent, or Firm* — Millen White Zelano and Branigan, PC; John Sopp (57) ABSTRACT

A resin sheet is manufactured by: forming a rapidly-cooled transparent polypropylene sheet by rapidly cooling a molten polypropylene resin; laminating on the rapidly-cooled transparent polypropylene sheet a resin layer of polyurethane resin, the polyurethane resin having a tensile-rupture elongation in a range from 150% to 900% and a softening point in a range from 50 degrees C. to 180 degrees C.; and laminating a print layer on the resin layer. A molded article having a non-planar molding made of the resin sheet is provided by insert molding. The molding is formed into a complicated shape where a part of the molding has: 150% or more of an elongation ratio; 0.8 or less of a film-thickness ratio (B/A) before and after the sheet is molded; and/or a surface area ratio (Y/X) before and after the sheet is molded in a range from 1.5 to 5.

5 Claims, 3 Drawing Sheets (51) Int. Cl.

| | | |
|---|---|---|
| B29C 47/14 | (2006.01) | |
| B29C 47/88 | (2006.01) | |
| B32B 27/08 | (2006.01) | |
| B32B 27/32 | (2006.01) | |
| B32B 27/40 | (2006.01) | |
| B29C 47/92 | (2006.01) | |
| B29K 23/00 | (2006.01) | |
| B29K 75/00 | (2006.01) | |
| B29L 9/00 | (2006.01) | |

(52) U.S. Cl.
CPC ............ *B29C 47/88* (2013.01); *B29C 47/885* (2013.01); *B29C 47/886* (2013.01); *B29D 7/01* (2013.01); *B32B 27/32* (2013.01); *B32B 27/40* (2013.01); *B29C 47/8845* (2013.01); *B29C 47/92* (2013.01); *B29K 2023/12* (2013.01); *B29K 2075/00* (2013.01); *B29L 2009/00* (2013.01); *B32B 2307/412* (2013.01); *B32B 2307/54* (2013.01); *B32B 2307/72* (2013.01); *B32B 2451/00* (2013.01); *B32B 2457/00* (2013.01); *B32B 2509/00* (2013.01); *B32B 2605/00* (2013.01)

(56) References Cited

U.S. PATENT DOCUMENTS

| | | |
|---|---|---|
| 2008/0318074 A1 | 12/2008 | Suga et al. |
| 2012/0059123 A1 | 3/2012 | Nakano |
| 2013/0280507 A1 | 10/2013 | Kondo |

FOREIGN PATENT DOCUMENTS

| | | |
|---|---|---|
| JP | 2001-213976 A | 8/2001 |
| JP | 2007-118597 A | 5/2007 |
| JP | 2007-307831 A | 11/2007 |
| JP | 2012-139826 A | 7/2012 |
| TW | 201231523 A1 | 8/2012 |
| WO | 2012090902 A1 | 7/2012 |

OTHER PUBLICATIONS

Translation of JP 2000-185383. (Year: 2000).*
Extended European Search Report dated Feb. 17, 2017, issued in corresponding EP14774179.7, 7 pages.
International Search Report from PCT Application No. PCT/JP2014/058503 dated Jun. 17, 2014.
Chinese Office Action dated Sep. 1, 2016 issued in corresponding Chinese patent application No. 20140019332.2, 30 pages.
English translation Abstract of JP2012-139826A published Jul. 26, 2012 (1 page).
Bing, C. et al., "Modified Polypropylene New Material", Beijing Chemeical Industry Publishing Company, Sep. 2002, 3 pages.
Taiwanese Office Action dated Jun. 6, 2017 issued in corresponding TW Patent Application No. 103111854 (8 pages).
English Translation of Taiwanese Office Action dated Jun. 6, 2017 issued in corresponding TW Patent Application No. 103111854 (5 pages).
English Abstract of TW 201231523 A published Aug. 1, 2012.

* cited by examiner

FIG. 3

LAMINATED BODY, MOLDED BODY, MOLDED PRODUCT, AND METHOD FOR MANUFACTURING MOLDED PRODUCT

TECHNICAL FIELD

The present invention relates to a laminate including a transparent resin sheet of a polypropylene resin, a molding, a molded article and a method for producing the molded article.

BACKGROUND ART

In order to reduce environmental burden by eliminating coating or plating and to apply a new design to an exterior component for various products including portable communication terminals, home electronics and vehicles, it has been known to produce molded article applied with a new design through a decorative molding process (e.g. water pressure transfer, film insert molding, and in-mold molding).

Examples of the known molding process for producing such a molded article include an insert molding using a molded product of a printed polypropylene sheet (see, for instance, Patent Literatures 1 to 3).

Patent Literature 1 discloses a process, in which a pattern layer is formed on a side of a polypropylene film using vacuum molding and the like, the obtained molding is set in a die, and a desired molded article is produced using an injection molding.

Patent Literature 2 discloses a process, in which a molding including an image layer between a polypropylene sheet and a polyolefin sheet is set in a die, and a resin is injected to be integrated with the molding to provide a molded article.

Patent Literature 3 discloses an insert molding of a laminate including a polypropylene sheet, and an easy-adhesion layer of acryl polyol resin that is printed thereon.

CITATION LIST

Patent Literature(s)

| | |
|---|---|
| Patent Literature 1 | JP-A-2000-141401 |
| Patent Literature 2 | JP-A-2007-118597 |
| Patent Literature 3 | JP-A-2007-307831 |

SUMMARY OF THE INVENTION

Problem(s) to be Solved by the Invention

However, when a molded article with a complicated shape is produced through an injection molding using the printed polypropylene sheet as disclosed in Patent Literatures 1 and 2, the polypropylene sheet may be whitened to impair the appearance (designability) thereof, so that the process is not suitable for producing an exterior component with a complicated shape.

Thus, it has been desired to apply a decorative molding using a polypropylene sheet to an exterior component with a complicated shape.

In addition, the print layer of the molded product disclosed in Patent Literatures 1 and 2 using the printed polypropylene sheet is not stably adhered to the surface of the polypropylene sheet due to chemical resistance of the polypropylene sheet unless specific printing material is used. Especially, when the molded product is shaped in a non-planar form for the insert molding, the print layer may be cracked or peeled off. Even with an easy-adhesion layer of acryl polyol resin as disclosed in Patent Literature 3, when the molded product has a complicated shape and thus accompanies a large deformation, the easy-adhesion layer may be cracked to cause cracking or peeling of the print layer.

Accordingly, the print layer has to be provided using the specific print material, so that decorative effect is applied only to a limited degree and an improvement in printability has also been desired.

An object of the invention is to provide a laminate capable of providing a favorable decoration even to an article with a complicated shape, a molding, a molded article and a method for producing the molded article.

Means for Solving the Problem(s)

A laminate according to an aspect of the invention includes: a transparent polypropylene layer (A) of a polypropylene resin; and a resin layer (B) of a polyurethane resin, the polyurethane resin having a tensile-rupture elongation in a range from 150% to 900% and a softening point in a range from 50 degrees C. to 180 degrees C., the transparent polypropylene layer (A) and the resin layer (B) being laminated with each other, ion which the transparent polypropylene layer (A) is formed by rapidly cooling a molten resin of the polypropylene resin.

According to the above aspect of the invention, the laminate includes the laminated structure including the transparent polypropylene layer (A) obtained by rapidly cooling the molten resin, and a resin layer (B) of the polyurethane resin having the tensile-rupture elongation in a range from 150% to 900% and the softening point in a range from 50 degrees C. to 180 degrees C. Accordingly, even when the resin sheet is formed into a complicated shape, the elongation during the forming process is absorbed by the resin layer (B) and is not likely to be transferred to, for instance, a print layer provided on the resin layer (B), so that the print layer is kept from being cracked or peeled off. Further, even when the sheet is formed into a complicated shape, the transparent polypropylene layer (A) is not whitened, thereby providing a favorable appearance.

In the laminate according to the above aspect of the invention, it is preferable that the molten resin is rapidly cooled using a cooling roller whose surface temperature is kept in a range from a dew point to 50 degrees C. to form the transparent polypropylene layer (A).

According to the above arrangement, since the cooling roller whose surface temperature is kept in a range from the dew point to 50 degrees C. is used to rapidly cool the molten resin, the laminate capable of being kept from being whitened even when being formed into a complicated shape can be easily provided.

A laminate according to another aspect of the invention includes: a transparent polypropylene layer (A) of a polypropylene resin; and a resin layer (B) of a polyurethane resin, the polyurethane resin having a tensile-rupture elongation in a range from 150% to 900% and a softening point in a range from 50 degrees C. to 180 degrees C., the transparent polypropylene layer (A) and the resin layer (B) being laminated with each other, in which the transparent polypropylene layer (A) has 4 μm or less of an average spherulite radius, 600 or less per $mm^2$ of an average spherulite number in a cross section of the sheet, 0.896 g/cm3 or less of a solid density, less than 90 J/g of a fusion enthalpy ΔH of a maximum endothermic peak in a differential scanning calorimetry (DSC) curve, 90% or more of a glossiness on at least one side, and 1 J/g or more of an exothermic peak at a low-temperature side of the maximum endothermic peak.

According to the above aspect of the invention, the laminate includes the laminated structure including the transparent polypropylene layer (A) whose average spherulite radius, average spherulite number, solid density, fusion enthalpy, glossiness, and exothermic peak are defined in the above range of values, and a resin layer (B) of the polyurethane resin having the tensile-rupture elongation in a range from 150% to 900% and the softening point in a range from 50 degrees C. to 180 degrees C. Accordingly, even when the resin sheet is formed into a complicated shape, the elongation during the forming process is absorbed by the resin layer (B) and is not likely to be transferred to, for instance, a print layer provided on the resin layer (B), so that the print layer is kept from being cracked or peeled off. Further, even when the sheet is formed into a complicated shape, the transparent polypropylene layer (A) is not whitened, thereby providing a favorable appearance.

In the laminate according to the above aspect of the invention, it is preferable that the resin layer (B) is made of the polyurethane resin having a tensile-rupture elongation in a range from 200% to 850% and a softening point in a range from 90 degrees C. to 170 degrees C.

According to the above arrangement, since the resin layer (B) is formed of the polyurethane resin having a tensile-rupture elongation in a range from 200% to 850% and a softening point in a range from 90 degrees C. to 170 degrees C., the print layer is further reliably kept from being cracked or peeled off.

When the tensile-rupture elongation of the resin layer is less than 150%, the resin layer cannot follow the elongation of the transparent polypropylene layer during the thermoforming to cause cracks, which results in cracking and/or peeling of the print layer. When the tensile-rupture elongation exceeds 900%, the water resistance deteriorates.

When the softening point of the resin layer is lower than 50 degrees C., the strength of the resin layer (B) at normal temperature is insufficient to cause cracking and/or peeling of the print layer. When the softening point is greater than 180 degrees C., the resin layer (B) is not sufficiently softened during the thermoforming process to generate cracking on the resin layer (B) and cause cracking and/or peeling on the print layer.

In view of the above, the resin layer (B) is formed using the polyurethane resin having the tensile-rupture elongation in a range from 150% to 900%, preferably in a range from 200% to 850%, especially preferably in a range from 300% to 750%, and the softening point in a range from 50 degrees C. to 180 degrees C., preferably in a range from 90 degrees C. to 170 degrees C., especially preferably in a range from 100 degrees C. to 165 degrees C.

In the laminate according to the above aspect of the invention, it is preferable that the resin layer (B) is made of a resin obtained by reacting at least diisocyanate, a high-molecular-weight polyol and a chain extender, the high-molecular-weight polyol being selected from polyether polyol and polycarbonate polyol.

According to the above arrangement, the resin layer (B) is formed by reacting diisocyanate, high-molecular-weight polyol and chain extender, and the high-molecular-weight polyol is selected from polyether polyol and polycarbonate polyol. Accordingly, even when the laminate is formed into a complicated non-planar shape, the layer structure can favorably conform to the configuration of the transparent polypropylene layer (A), whereby, even when the resin layer (B) is provided with the print layer, the print layer can be kept from being cracked or peeled off.

In the laminate according to the above aspect of the invention, it is preferable that the resin layer (B) is the polyurethane resin.

Especially, since the resin layer (B) is formed of polyurethane resin, the print layer is further unlikely to be cracked or peeled off. In addition, the resin layer can be easily provided using a coating process and the like, whereby the laminate can be easily formed.

In the laminate according to the above aspect of the invention, it is preferable that at least a part of a side of the resin layer (B) opposite to a side adjacent to the transparent polypropylene layer (A) is applied with printing.

According to the above aspect of the invention, even when being formed into a complicated shape after printing is applied to at least a part of a side of the resin layer (B) opposite to the side adjacent to the transparent polypropylene layer (A), the printing is kept from being peeled off or cracked and the transparent polypropylene layer (A) is not whitened, thereby providing an excellent appearance even with a complicated shape.

A molding according to still another aspect of the invention includes the laminate according to any of the above aspects of the invention, the laminate being formed into a non-planar shape.

According to the above arrangement, since the laminate of the above aspect of the invention is formed into a non-planar form, even when the molding is formed into a complicated shape after printing is applied, the printing is kept from being peeled off or cracked and the transparent polypropylene layer (A) is not whitened, thereby providing an excellent appearance even with a complicated shape.

A molded article according to a further aspect of the invention includes: a base; and the molding according to the above aspect of the invention provided to a part of the base.

According to the above arrangement, even when the molding is formed into a complicated shape and, for instance, a print layer is provided, the printing is kept from being peeled off or cracked and the transparent polypropylene layer (A) is not whitened, thereby providing an excellent appearance with the polypropylene resin even with a complicated shape.

A molded article according to still further aspect of the invention includes: a base; and a molding provided to at least a part of the base, the molding being obtained by forming a transparent resin sheet into a non-planar shape, the transparent resin sheet being formed by rapidly cooling a molten resin of a polypropylene resin.

According to the above aspect of the invention, the molding provided by using the resin sheet obtained by rapidly cooling the molten resin and shaped into a non-planar form is provided to at least a part of the base. Accordingly, even with a molded article having a complicated shape, the resin sheet of the molding can be kept from being whitened to provide an excellent appearance.

In the molded article according to the above aspect of the invention, it is preferable that the molten resin is rapidly cooled using a cooling roller whose surface temperature is kept in a range from a dew point to 50 degrees C. to form the resin sheet.

According to the above arrangement, since the cooling roller whose surface temperature is kept in a range from the dew point to 50 degrees C. is used to rapidly cool the molten resin, the resin sheet capable of being kept from being whitened even when being formed into a complicated shape can be easily provided.

A molded article according to still further aspect of the invention includes: a base; and a molding provided at least a part of the base, the molding being obtained by forming a transparent resin sheet comprising a polypropylene resin into a non-planar shape, in which the resin sheet has 4 µm or less of an average spherulite radius, 600 or less per mm² of an average spherulite number in a cross section of the resin sheet, 0.896 g/cm³ or less of a solid density, less than 90 J/g of a fusion enthalpy ΔH of a maximum endothermic peak in a differential scanning calorimetry (DSC) curve, 90% or more of a glossiness on at least one side, and 1 J/g or more of an exothermic peak at a low-temperature side of the maximum endothermic peak.

According to the above aspect of the invention, the resin sheet whose average spherulite radius, average spherulite number, solid density, fusion enthalpy, glossiness, and exothermic peak are within the above predetermined range is formed into a non-planar shape. Accordingly, even when the resin sheet is formed into a complicated shape, the resin sheet is kept from being whitened and excellent appearance can be provided.

It should be noted that the average spherulite radius exceeding 4 µm is not preferable because the internal haze increases (i.e. transparency deteriorates). More preferably, the average spherulite radius is 3 µm or less. The average spherulite radius is preferably as small as possible and no lower limit is specified. When the average spherulite number in the sheet cross section exceeds 600/mm², the softening point of the sheet is unfavorably raised. More preferably, the average spherulite number is 400/mm² or less. The solid density more than 0.896 g/cm³ is not preferable because the density becomes excessively large (in other words, the crystallinity degree is excessively high).

In the molded article according to the above aspect of the invention, it is preferable that at least a part of the resin sheet is elongated.

According to the above arrangement, at least a part of the resin sheet is elongated to be formed into a non-planar shape. Accordingly, even a partly elongated complicated shape is to be formed, the resin sheet is kept from being whitened, thereby providing an excellent appearance.

It should be noted that the term "elongated" refers not only to a process for elongating the entirety of an object but encompasses a process in which only a part of the object is elongated or a plurality of parts of the object are elongated.

In the molded article according to the above aspect of the invention, it is preferable that at least a portion of the molded article may be formed to have an elongation ratio of 150% or more.

According to the above arrangement, even when at least a part of the resin sheet is formed into a non-planar shape with an elongation ratio of 150% or more, in other words, when a part of the resin sheet is partially elongated into a complicated shape at an elongation ratio of 150% or more, the resin sheet is not whitened and it is expected that a favorable decorative effect can be provided.

In the molded article according to the above aspect of the invention, a ratio (Y/X) of a surface area Y of the resin sheet after being molded to a surface area X of the resin sheet before being molded may be in a range from 1.5 to 10.

With the above arrangement, it is expected that, even when the sheet is formed into a complicated shape where a surface area ratio (Y/X) of the surface area Y after being molded to the surface area X before being molded is in a range from 1.5 to 10 (i.e. a large deformation is partially caused when being formed into the non-planar shape), the resin sheet is not whitened and a favorable decorative effect can be provided.

In the molded article according to the above aspect of the invention, a film-thickness ratio (B/A) of a thickness B of the resin sheet after being molded to a thickness A of the resin sheet before being molded of at least a portion of the molded article may be 0.8 or less.

With the above arrangement, it is expected that, even when the sheet is formed into a complicated shape where a thickness ratio (B/A) of the thickness B after being molded to the thickness A before being molded is 0.8 or less (i.e. a large deformation is partially caused when being formed into the non-planar shape), the resin sheet is not whitened and a favorable decorative effect can be provided.

In the molded article according to the above aspect of the invention, at least a part of a surface of the molded article may be applied with a printing.

With the above arrangement, even when the molding is formed into a complicated shape after a printing is applied to at least a part of the surface of the molding, the printing is kept from being peeled off or cracked and the resin sheet is not whitened, thereby providing a favorable decorative effect and excellent appearance effect even with a complicated shape.

In the molded article according to the above aspect of the invention, it is preferable that the molding is provided to a part of the base through an insert molding.

With the above arrangement, since the molding of the above aspect of the invention is provided to a part of the base using insert molding, decorative effect can be favorably provided to the base having the complicated shape.

A method for manufacturing a molded article according to still further aspect of the invention includes: using an apparatus comprising a plurality of cooling rollers, a mirror-finished endless belt looped around the plurality of cooling rollers, and a mirror-finished cooling roller, surface temperatures of the mirror-finished endless belt and the mirror-finished cooling roller being kept in a range from a dew point to 50 degrees C.; extruding a molten resin of a polypropylene resin into a nip between the mirror-finished cooling roller and the mirror-finished endless belt using a T-die extruder to press the molten resin into a form of a sheet; rapidly cooling the molten resin by spraying a cooling water to the mirror-finished endless belt, a temperature of the cooling water being lower than the surface temperature of the mirror-finished endless belt, to manufacture a transparent rapidly-cooled transparent polypropylene sheet; laminating a resin layer of a polyurethane resin to the rapidly-cooled transparent polypropylene sheet to form a laminate, the polyurethane resin having a tensile-rupture elongation in a range from 150% to 900% and a softening point in a range from 50 degrees C. to 180 degrees C.; and shaping the laminate into a non-planar shape and providing the laminate to at least a part of the base.

According to the above aspect of the invention, an apparatus including a plurality of cooling rollers, a mirror-finished endless belt looped around the plurality of cooling rollers, and a mirror-finished cooling roller is used, where surface temperatures of the mirror-finished endless belt and the mirror-finished cooling roller is kept in a range from a dew point to 50 degrees C. Then, a molten resin of polypropylene resin is extruded into a nip between the mirror-finished cooling roller and the mirror-finished endless belt using a T-die extruder to press the molten resin into a form of a sheet. Further, a cooling water whose temperature water is lower than the surface temperature of the mirror-finished endless belt is sprayed to the mirror-finished endless belt to rapidly cool the molten resin, thereby manufacturing a transparent rapidly-cooled transparent polypropylene sheet. A resin layer of a polyurethane resin having a tensile-rupture elongation in a range from 150% to 900% and a softening point in a range from 50 degrees C. to 180 degrees C. is laminated to the obtained rapidly-cooled transparent polypropylene sheet to form a laminate. The obtained laminate is formed into a non-planar form and is provided to at least a part of the base. Accordingly, even when the laminate is formed into a complicated shape, the elongation during the forming process is absorbed by the resin layer and is not likely to be transferred to, for instance, a print layer provided on the resin layer, so that the print layer is kept from being cracked or peeled off. In addition, even when being formed into a complicated shape, the rapidly-cooled transparent polypropylene sheet can be kept from being whitened, so that a molded article with a complicated shape can be favorably decoratively formed without impairing the appearance thereof.

A method for manufacturing a molded article according to still further aspect of the invention includes: using an apparatus comprising a plurality of cooling rollers, a mirror-finished endless belt looped around the plurality of cooling rollers, and a mirror-finished cooling roller, surface temperatures of the mirror-finished endless belt and the mirror-finished cooling roller being kept in a range from a dew point to 50 degrees C.; extruding a molten resin of a polypropylene resin into a nip between the mirror-finished cooling roller and the mirror-finished endless belt using a T-die extruder to press the molten resin into a form of a sheet; rapidly cooling the molten resin by spraying a cooling water to the mirror-finished endless belt, a temperature of the cooling water being lower than the surface temperature of the mirror-finished endless belt, to manufacture a transparent rapidly-cooled transparent polypropylene sheet; and shaping the resin sheet into a non-planar shape and providing the resin sheet to at least a part of the base.

According to the above aspect of the invention, an apparatus including a plurality of cooling rollers, a mirror-finished endless belt looped around the plurality of cooling rollers, and a mirror-finished cooling roller is used, where surface temperatures of the mirror-finished endless belt and the mirror-finished cooling roller is kept in a range from a dew point to 50 degrees C. Then, a molten resin of polypropylene resin is extruded into a nip between the mirror-finished cooling roller and the mirror-finished endless belt using a T-die extruder to press the molten resin into a form of a sheet. Further, a cooling water whose temperature water is lower than the surface temperature of the mirror-finished endless belt is sprayed to the mirror-finished endless belt to rapidly cool the molten resin, thereby manufacturing a transparent resin sheet. The obtained resin sheet is formed into a non-planar form and is provided to at least a part of the base. Accordingly, even when the resin sheet is formed into a complicated shape, the resin sheet can be kept from being whitened, so that a molded article with a complicated shape can be favorably decoratively formed without impairing the appearance thereof.

DESCRIPTION OF EMBODIMENT(S)

Exemplary embodiments of the invention will be described below with reference to drawings.

It should be noted that, though an insert molding of a molded article having a molding at a part thereof is exemplified in the exemplary embodiments, the scope of the invention is not limited thereto.

First Exemplary Embodiment

Arrangement of Molded Article

Figure 1:
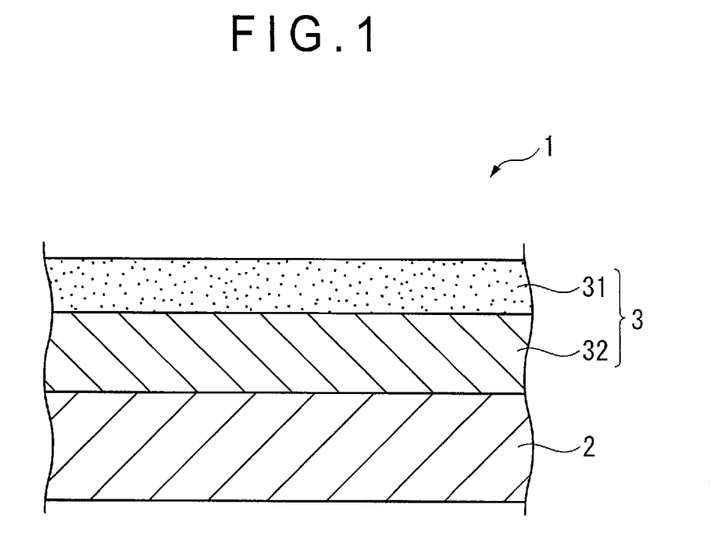
FIG. 1 is a cross section showing a molded article according to a first exemplary embodiment of the invention.

In FIG. 1, 1 denotes a molded article. The molded article 1 is used for an exterior component of various products such as portable communication terminals, home electronics and vehicles. The molded article 1 includes a base 2 and a molding 3 integrally attached to a part of the base 2 with an insert molding.

The base 2 is provided by, for instance, a thermoplastic resin usable for insert molding.

Specific examples of the thermoplastic resin include polypropylene, polyethylene, polycarbonate, acetylene-styrene-butadiene copolymer, and acryl polymer. It should be noted, however, that the material of the base 2 is not limited to the above.

The base 2 may be added with an inorganic filler such as a fiber and talc.

The molding 3 is provided by thermoforming a resin sheet (not shown) into a predetermined shape.

The resin sheet has a laminated structure, in which a polypropylene layer 31 of rapidly-cooled transparent polypropylene sheet and a print layer 32 provided at least a part of at least one side of the polypropylene layer 31 are sequentially layered.

Though detailed later, the polypropylene layer 31 is a sheet-shaped member obtained by rapidly cooling a molten polypropylene resin.

Though detailed later, the rapid-cooling process is conducted using an apparatus including, for instance: a plurality of cooling rollers; a mirror-finished endless belt looped around the plurality of cooling rollers; and a mirror-finished cooling roller, where surface temperatures of the mirror-finished endless belt and the mirror-finished cooling roller are kept in a range from the dew point to 50 degrees C. A molten resin (polypropylene resin) extruded from a T-die extruder is introduced into a nip between the mirror-finished cooling roller and the mirror-finished endless belt to rapidly cool the molten resin into a sheet shape.

It is only necessary for the polypropylene resin to be a polymer including propylene. In addition to polypropylene, the polypropylene resin may be a copolymer of propylene and an olefin such as ethylene, or a mixture of polypropylene and polyolefin such as polyethylene or a polyolefin copolymer. Polypropylene is especially preferable in terms of heat resistance and hardness.

The polypropylene is selected from homopolypropylene, random polypropylene, block polypropylene, and a mixture thereof.

The polypropylene resin may be added with an additive such as pigment, antioxidant, stabilizer and ultraviolet absorber, as necessary.

The polypropylene layer 31 molded under the above rapid-cooling conditions exhibits, for instance, 4 µm or less of an average spherulite radius, 600 or less per mm$^2$ of average spherulite number in a sheet cross section, 0.896 g/cm$^3$ or less of solid density, less than 90 J/g of fusion enthalpy ΔH of maximum endothermic peak in a differential scanning calorimetry (DSC) curve, 90% or more of glossiness on at least one side, and 1 J/g or more of exothermic peak on a low-temperature side of the maximum endothermic peak.

The average spherulite radius is 4 µm or less, preferably 3 µm or less, especially preferably 2 µm or less.

When the average spherulite radius is greater than 4 µm, the internal haze increases to lower the transparency, whereby favorable appearance cannot be provided.

The average spherulite radius can be measured by, for instance, observing an obtained cross section of a resin sheet using a polarization microscope.

The average spherulite number in a cross section of the sheet is 600 or less per mm$^2$, preferably 400/mm$^2$ or less, especially preferably 200/mm$^2$ or less.

When the average spherulite number exceeds 600/mm$^2$, the density (i.e. crystallinity degree) becomes excessively and unfavorably high.

The average spherulite number can be measured by, for instance, observing an obtained cross section of a resin sheet using a polarization microscope.

The solid density is 0.896 g/cm$^3$ or less, preferably in a range from 0.860 g/cm$^3$ to 0.893 g/cm$^3$, especially preferably in a range from 0.885 g/cm$^3$ to 0.890 g/cm$^3$.

When the solid density exceeds 0.896 g/cm$^3$, the density (i.e. crystallinity degree) becomes excessively and unfavorably high. It should be noted that, when the solid density becomes 0.860 g/cm$^3$ or less, the stiffness of the sheet is excessively low and the sheet is difficult to be subjected to a secondary processing. Accordingly, the solid density is preferably 0.860 g/cm$^3$ or more.

The solid density can be measured through a method according to JIS K7112.

The fusion enthalpy ΔH of the maximum endothermic peak of the differential scanning calorimetry (DSC) curve is less than 90 J/g, preferably in a range from 55 J/g to 80 J/g, especially preferably in a range from 60 J/g to 75 J/g.

When the fusion enthalpy ΔH is 90 J/g or more, the sheet is not easily softened upon thermoforming and thus is difficult to be molded into a complicated shape. It should be noted that, when the fusion enthalpy becomes 55 J/g or less, the sheet is softened during a thermal processing (e.g. drying after printing). Accordingly, the fusion enthalpy is preferably 55 J/g or more.

The fusion enthalpy ΔH can be calculated with reference to an area of the maximum endothermic peak in a differential scanning calorimetry curve measured using a differential scanning calorimeter (DSC-77: manufactured by PerkinElmer Japan Co., Ltd.) under the following conditions.

Measurement start temperature: 50 degrees C.
Measurement end temperature: 220 degrees C.
Temperature increase rate: 10 degrees C./min The glossiness of at least one side (i.e. a side of the sheet corresponding to the surface of the molded article 1) is 90% or more, preferably in a range from 95% to 170%, especially preferably in a range from 120% to 160%.

This is because, when the glossiness is less than 90%, the light does not transmit through the sheet but reflects on the surface of the sheet, whereby the transparency may be deteriorated.

The glossiness is obtained by, for instance: measuring a reflected light beam ψrs received at an angle of 60 degrees when the light beam is emitted onto the sheet at an incident angle of 60 degrees, using an automatic colorimetric color difference meter (AUD-CH-2type-45, 60, manufactured by Suga Test Instruments Co., Ltd.); and calculating a ratio against a light beam reflected by a surface of a glass (reflectivity 1.567) according to the following formula (1).

$$\text{Surface glossiness } (Gs) = (\psi s/\psi 0s)*100 \tag{1}$$

An exothermic peak of the maximum endothermic peak on a low-temperature side is 1 J/g or more. The exothermic peak is a peak of exotherm caused when a part of the sheet transforms from a smectic phase to an alpha phase, which is a phenomenon unique to a rapidly-cooled polypropylene sheet having the above predetermined average spherulite radius, average spherulite number, solid density, differential scanning calorimetry, and surface glossiness.

It should be noted that the exothermic peak is determined by, for instance, checking whether the exothermic peak is present at a lower-temperature side than a temperature exhibiting the maximum endothermic peak in the above differential scanning calorimetry curve.

The print layer 32 is provided adjacent to the polypropylene layer 31 by printing on the rapidly-cooled transparent polypropylene sheet.

The printing method may be any generally usable printing method including screen printing, offset printing, gravure printing, roll coating and spray coating. In addition to the above, metal evaporation providing an evaporation film and lamination of metal film are also usable. Among the above, screen printing is preferable in that the ink layer thickness can be increased and thus ink cracking is unlikely to occur when the sheet is molded into a complicated shape.

At least a part of the molding 3 having been shaped into a predetermined shape is elongated.

Specifically, elongation ratio of the greatly deformed portion is 150% or more, preferably in a range from 180% to 500%, especially preferably in a range from 200% to 400% to exhibit a complicated shape. Even when at least a part of the molding is molded to have a complicated shape (i.e. having 150% or more of the elongation ratio), the transparent polypropylene layer 31 is not whitened.

When the elongation ratio is 150% or less, the deformation rate is small enough for the other material not to be whitened and a desired complicated shape cannot be provided. When the elongation ratio exceeds 800%, the transparent polypropylene layer 31 may be whitened and/or the print layer 32 may be cracked or peeled off. Accordingly, the elongation ratio is preferably 800% or less.

The presence of the whitening can be checked from an outside of, for instance, a transparent molded article that is painted black on an inside of the transparent molding article. When the transparent molded article is whitened, the black paint is seen slightly white. On the other hand, when the transparent molded article is not whitened, the black color is clearly observable. The elongation ratio can be controlled by, for instance, setting the conditions of thermoforming (e.g. heating temperature during the thermoforming, die temperature) and/or according to die design.

In addition, in the greatly elongated part, a film-thickness ratio (B/A) of a thickness B of the rapidly-cooled transparent polypropylene sheet after being molded (post-molded rapidly-cooled transparent polypropylene sheet) and a thickness A of the rapidly-cooled transparent polypropylene sheet before being molded (pre-molded rapidly-cooled transparent polypropylene sheet) is 0.8 or less, preferably in a range from 0.01 to 0.75, especially preferably in a range from 0.05 to 0.7. Even when the molding is formed into a complicated shape, at which the elongation caused by a deformation of the non-planar molded part is large enough to exhibit the film-thickness ratio (B/A) of 0.8 or less, the transparent polypropylene layer 31 is kept from being whitened.

When the film-thickness ratio (B/A) of the molding is greater than 0.8, the partial deformation is small enough for the other material not to be whitened and a desired complicated shape cannot be provided. When the film-thickness ratio exceeds 0.01, the transparent polypropylene layer 31 may be whitened and/or the print layer 32 may be cracked or peeled off. Accordingly, the film-thickness ratio is preferably 0.01 or less.

The film-thickness ratio can be controlled according to the conditions during the thermoforming process and the design of a molding die.

When the molding 3 is formed into a non-planar shape, a surface area ratio (Y/X) between a surface area X of the pre-molded rapidly-cooled transparent polypropylene sheet and a surface area Y of the post-molded rapidly-cooled transparent polypropylene sheet is in a range from 1.5 to 10, preferably in a range from 1.7 to 5, especially preferably in a range from 2 to 4. Even when the molding is formed into a complicated shape, at which the elongation caused by a deformation of the non-planar molded part is large enough to exhibit the surface area ratio (Y/X) in a range from 1.5 to 10, the transparent polypropylene layer 31 is kept from being whitened.

When the surface area ratio of the molding is greater than 1.5, the partial deformation is small enough for the other material not to be whitened and a desired complicated shape cannot be provided. On the other hand, when the surface area ratio exceeds 5, the transparent polypropylene layer 31 may be whitened and/or the print layer 32 may be cracked or peeled off.

The surface area of, for instance, a cube and a rectangular parallelepiped can be calculated by measuring a depth and lengths of the respective sides using a caliper gauge. When a surface area of a molding having a profile (e.g. a curve) difficult to be calculated from measurements is to be measured, a three-dimensional scanner (e.g. non-contact three-dimensional digitizer) can be used. The surface area ratio can be controlled according to the conditions during the thermoforming process and the design of a molding die.

Manufacture of Molding

Next, a process for forming a molding according to the exemplary embodiment will be described below.

Figure 3:
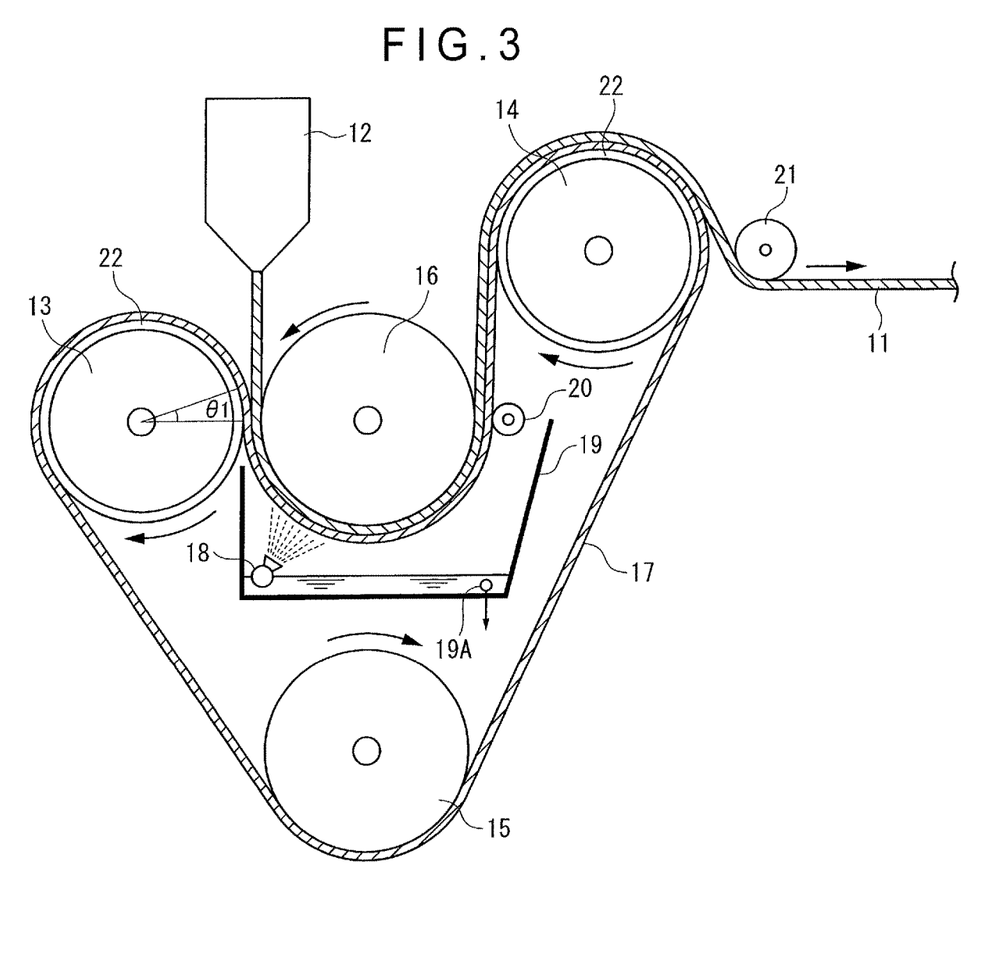
FIG. 3 is an illustration schematically showing an apparatus for producing a rapidly-cooled transparent polypropylene sheet for a molding provided to the molded article.

In order to provide the rapidly-cooled transparent polypropylene sheet for forming the molding 3, a manufacture apparatus shown in FIG. 3 is usable.

The manufacture apparatus includes a T-die 12 of an extruder, a first cooling roller 13, a second cooling roller 14, a third cooling roller 15, a fourth cooling roller 16, a metal endless belt 17, a cooling-water spraying nozzle 18, a water bath 19, a water-absorption roller 20, and a peeling roller 21.

The first cooling roller 13, the second cooling roller 14 and the third cooling roller 15 are made of metal. A, for instance, water-cooling cooler (not shown) is provided inside these rollers in order to control a surface temperature of the rollers.

Surfaces of the first and second cooling rollers 13 and 14 are covered with an elastic member 22 made of a material such as nitrile-butadiene rubber (NBR). The elastic member 22 preferably has a hardness of 60 degrees or less (measured by a method in accordance with JIS K6301A) and a thickness of 10 mm.

A rotary shaft of at least one of the first, second and third cooling rollers 13, 14 and 15 is connected to a rotation drive (not shown).

The fourth cooling roller 16 is made of metal and has a mirror-finished surface having 1.0 S or less of surface roughness. A, for instance, water-cooling cooler (not shown) is provided inside in order to control a surface temperature of the fourth cooling roller. When the surface roughness is greater than 1.0 S, the glossiness of the obtained rapidly-cooled transparent polypropylene sheet 11 is lowered, resulting in a poorly transparent sheet.

The fourth cooling roller 16 is disposed so that the extruded polypropylene sheet is held between the fourth cooling roller 16 and the first cooling roller 13 via the metal endless belt 17.

The metal endless belt 17 is made of a stainless steel or the like and has a mirror-finished surface with a surface roughness of 1.0 S or less. The metal endless belt 17 is looped around the above-described first to third cooling rollers 13 to 15 in a rotatable manner.

The cooling-water spraying nozzle 18 is provided under a lower surface of the fourth cooling roller 16. With the cooling-water spraying nozzle 18, cooling water is sprayed on a back surface of the metal endless belt 17. The metal endless belt 17 and the polypropylene sheet immediately after being sheet-pressed by the first and fourth cooling rollers 13 and 16 are thus rapidly cooled.

The water bath 19, which is formed in a box of which an upper surface is open, is provided so as to cover the entire lower surface of the fourth cooling roller 16. The water bath 19 collects the sprayed cooling water and discharges the collected cooling water from a drainage port 19A formed on a lower side of the water bath 19.

The water-absorption roller 20 is provided on a lateral side of the fourth cooling roller 16 near the second cooling roller 14 to be in contact with the metal endless belt 17. The water-absorption roller 20 removes extra cooling water attached on the back surface of the metal endless belt 17.

The peeling roller 21 is disposed so that the rapidly-cooled transparent polypropylene sheet 11 is guided to be biased against the metal endless belt 17 and the second cooling roller 14. The peeling roller 21 also peels the rapidly-cooled transparent polypropylene sheet 11 after being cooled from the metal endless belt 17.

A manufacturing method of the rapidly-cooled transparent polypropylene sheet 11 using the above-described manufacturing apparatus will be described below.

Firstly, a temperature of each of the cooling rollers 13, 14, 15 and 16 is controlled in advance so that a surface temperature of each of the metal endless belt 17 and the fourth cooling roller 16 which is in direct contact with the extruded molten resin to cool the molten resin is kept in a range from a dew point to 50 degrees C., preferably in a range from the dew point to 30 degrees C.

When the surface temperature of each of the fourth cooling roller 16 and the metal endless belt 17 is the dew point or less, condensation may generate on the surface to possibly make it difficult to form a uniform sheet. On the other hand, when the surface temperature exceeds 50 degrees C., transparency of the obtained rapidly-cooled transparent polypropylene sheet 11 is reduced and alpha crystals are increased to possibly make it difficult to thermally mold the rapidly-cooled transparent polypropylene sheet 11. Thus, the surface temperature is set at 14 degrees C. in the exemplary embodiment.

Next, a molten resin (not containing a nucleating agent) extruded through the T-die 12 of the extruder is held between the metal endless belt 17 on the first cooling roller 13 and the fourth cooling roller 16. Under this condition, the molten resin is pressed and rapidly cooled at 14 degrees C. by the first and fourth cooling rollers 13 and 16.

At this time, the elastic member 22 is compressed by the pressing force between the first cooling roller 13 and the fourth cooling roller 16 to be elastically deformed.

The polypropylene sheet is rapidly cooled at the portion at which the elastic member 22 is elastically deformed (i.e. an arc section corresponding to a center angle θ1 of the first cooling roller 13, and is sheet-pressed by the cooling rollers 13, 16. The sheet-pressure at this time is, for instance, in a range from 0.1 MPa to 20 MPa.

The polypropylene sheet thus pressed and held between the fourth cooling roller 16 and the metal endless belt 17 is sheet-pressed at an arc section corresponding to a substantially lower half of the fourth cooling roller 16 being held by the metal endless belt 17 and the fourth cooling roller 16, and is further rapidly cooled by cooling water sprayed on the back surface of the metal endless belt 17 by the cooling-water spraying nozzle 18. The sheet-pressure at this time is, for instance, in a range from 0.01 MPa to 0.5 MPa. The temperature of the cooling water is 8 degrees C.

The sprayed cooling water is collected in the water bath 19 while the collected water is discharged from the drainage port 19A.

The polypropylene sheet having been thus sheet-pressed and cooled by the fourth cooling roller 16 and adhered on the metal endless belt 17 is delivered to the second cooling roller 14 in accordance with the rotation of the metal endless belt 17. The polypropylene sheet being guided by the peeling roller 21 and pressed toward the second cooling roller 14 is sheet-pressed by the metal endless belt 17 at an arc section corresponding to substantially upper half of the second cooling roller 14 to be again cooled at a temperature of 30 degrees C. or less.

The sheet-pressure at this time is in a range from 0.01 MPa to 0.5 MPa.

The water attached on the back surface of the metal endless belt 17 is removed by the water-absorption roller 20 provided between the fourth cooling roller 16 and the second cooling roller 14.

The polypropylene sheet having been cooled on the second cooling roller 14 is peeled off from the metal endless belt 17 by the peeling roller 21 to be wound by a winding roller (not shown) at a predetermined rate. The thus manufactured rapidly-cooled transparent polypropylene sheet 11 has 4 μm or less of an average spherulite radius, 600 or less per mm² of an average spherulite number in a cross section of the sheet, 0.896 g/cm³ or less of the solid density, less than 90 J/g of fusion enthalpy ΔH of the maximum endothermic peak in a differential scanning calorimetry (DSC) curve, 90% or more of glossiness on at least one side, 1 J/g or more of an exothermic peak at a low-temperature side of the maximum endothermic peak, and 50 μm or more of thickness.

The manufactured rapidly-cooled transparent polypropylene sheet 11 is printed with, for instance, POS-911 Indian ink manufactured by Teikoku Printing Inks Mfg. Co., Ltd using a T-250 mesh (polyester mesh) for screen printing, and is dried in a drying furnace at 60 degrees C. for 90 minutes, thereby forming the print layer 32 laminated thereon at a predetermined position on the surface of the sheet to provide a resin sheet.

Subsequently, the resin sheet is heated to 145 degrees C. (surface temperature) using an infrared heater and is pressed onto a die by vacuum or a compressed air to be cooled, thereby being thermoformed to a predetermined shape to provide the molding 3.

The manufactured molding 3 is disposed in a predetermined die, on which a molten resin for the base 2 is injected to provide the molded article 1 provided with the molding 3 at a part of the surface thereof in an insert molding. The conditions for the injection molding (e.g. resin temperature, injection pressure and cooling details) can be appropriately selected according to the size of the molding and the like. However, the injection molding is usually performed approximately under the conditions of an injection temperature in a range from 180 to 250 degrees C., an injection pressure in a range from 5 MPa to 120 MPa, and a cooling die temperature in a range from 20 to 90 degrees C.

Advantage of First Exemplary Embodiment

According to the first exemplary embodiment, the non-planar molding 3 is formed using a resin sheet of the rapidly-cooled transparent polypropylene sheet 11 obtained by rapidly cooling a molten polypropylene resin. The molding 3 provided at a part of an article is formed using the rapidly-cooled transparent polypropylene sheet 11 having 4 μm or less of an average spherulite radius, 600 or less per mm² of an average spherulite number in a cross section of the sheet, 0.896 g/cm³ or less of the solid density, less than 90 J/g of fusion enthalpy ΔH of the maximum endothermic peak in a differential scanning calorimetry (DSC) curve, 90% or more of glossiness on at least one side, and 1 J/g or more of an exothermic peak at a low-temperature side of the maximum endothermic peak.

Accordingly, even with the molding 3 having a complicated shape, the polypropylene layer 31 of the rapidly-cooled transparent polypropylene sheet 11 is not whitened, whereby providing the molding 3 with an excellent designability and allowing the molded article 1 provided with the molding 3 at a part thereof to have an excellent appearance (designability).

In the first exemplary embodiment, the molding 3 is formed into a non-planar shape by elongating at least a part of the resin sheet of the rapidly-cooled transparent polypropylene sheet 11.

Accordingly, even in a non-planar molding having a complicated and partly elongated shape is to be formed, the polypropylene layer 31 of the rapidly-cooled transparent polypropylene sheet 11 is not whitened, thereby providing an excellent designability.

In the first exemplary embodiment, the molding 3 is formed to have a complicated shape with at least a part of the resin sheet of the rapidly-cooled transparent polypropylene sheet 11 having an elongation ratio of 150% or more.

When an article having a complicated shape with a part thereof being greatly elongated (i.e. elongation ratio of 150% or more) is formed, the polypropylene layer 31 of the rapidly-cooled transparent polypropylene sheet 11 is not whitened but an excellent decorative effect and appearance can be provided.

In addition, in the present exemplary embodiment, the molding 3 is formed to have a complicated shape with part thereof having a film-thickness ratio (B/A) of the thickness B of the resin sheet of the rapidly-cooled transparent polypropylene sheet after being molded to the thickness A of the resin sheet of the rapidly-cooled transparent polypropylene sheet 11 after being molded being 0.8 or less.

Even when the molding is formed into a complicated shape, at which the elongation caused by a deformation of the non-planar molded part is large enough to exhibit the film-thickness ratio (B/A) of 0.8 or less, the transparent polypropylene layer 31 of the rapidly-cooled transparent polypropylene sheet 11 is kept from being whitened, thereby providing favorable decorative effect and excellent appearance.

In addition, in the present exemplary embodiment, the molding 3 is formed to have a complicated shape with a part thereof having a surface area ratio (Y/X) between the surface area X of the resin sheet of the rapidly-cooled transparent polypropylene sheet before being molded and the thickness Y of the resin sheet of the rapidly-cooled transparent polypropylene sheet after being molded is in a range from 1.5 to 10.

Even when the molding is formed into a complicated shape, at which the deformation of the non-planar molded part is large enough to exhibit the surface area ratio (Y/X) in a range from 1.5 to 10, the transparent polypropylene layer 31 of the rapidly-cooled transparent polypropylene sheet 11 is kept from being whitened, thereby providing favorable decorative effect and excellent appearance.

In the present exemplary embodiment, the molding 3 is provided with the print layer 32.

Accordingly, even when the molding is formed into a complicated shape after applying printing to at least a part of the surface of the molding, the printing is kept from being peeled off or cracked and the polypropylene layer 31 of the rapidly-cooled transparent polypropylene sheet 11 is not whitened, thereby providing an excellent appearance even with a complicated shape.

Further, in the first exemplary embodiment, since the molded article 1 is provided at a part thereof with the molding 3 formed into a complicated shape without the polypropylene layer 31 being whitened, the molded article 1 can provide excellent appearance to a wide variety of exterior components to enhance versatility thereof.

In addition, since the molded article 1 provided at least a part thereof with the molding 3 is formed using an insert molding process, even an exterior component with a complicated shape can be easily produced with a favorable appearance.

Second Exemplary Embodiment

In the second exemplary embodiment, the same components as those in the first exemplary embodiment are denoted by the same reference symbols and the descriptions thereof will be omitted or simplified.
Arrangement of Molded Article In FIG. 2, 3A denotes a molding. The molding 3A is integrated to a part of a base (not shown) using an insert molding. Molded articles provided with the molding 3A are used for exterior components of various articles including portable communication terminals, home electronics and vehicles.

Figure 2:
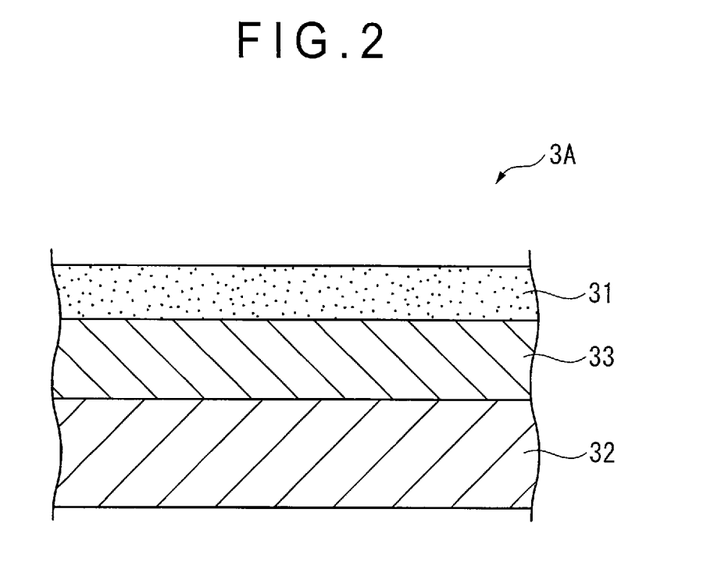
FIG. 2 is a cross section showing a molded article according to a second exemplary embodiment of the invention.

The base of the molded article is the same as that in the first exemplary embodiment.

The molding 3A is provided by thermoforming a resin sheet (not shown) into a predetermined shape.

The resin sheet includes a polypropylene layer 31 (transparent polypropylene layer (A)) made of the rapidly-cooled transparent polypropylene sheet, a resin layer 33 (resin layer (B)) provided at least one side of the polypropylene layer 31, and a print layer 32 provided at least on a side of the resin layer 33 opposite the side adjacent to the polypropylene layer 31, the polypropylene layer 31, the resin layer 33 and the print layer 32 being sequentially laminated.

It should be noted that the polypropylene layer 31 in the second exemplary embodiment is formed in the same manner as in the first exemplary embodiment.

The resin layer 33 is obtained by reacting diisocyanate, a high-molecular-weight polyol and a chain extender. The high-molecular-weight polyol is selected from polyether polyol and polycarbonate polyol.

With the above arrangement where the resin layer 33 is formed by reacting diisocyanate, high-molecular-weight polyol and chain extender and the high-molecular-weight polyol is selected from polyether polyol and polycarbonate polyol, even when the laminate is formed into a complicated non-planar shape, the layer structure can favorably conform to the configuration of the transparent polypropylene layer 31, whereby, even when the resin layer 33 is provided with the print layer, the print layer 32 can be kept from being cracked or peeled off.

The resin layer 33 can be formed by, for instance, coating a polyurethane resin using a gravure coater, a kiss coater, a bar coater and the like and drying the polyurethane resin at 80 degrees C. for one minute, whereby the resin layer 33 is laminated on one side of the rapidly-cooled transparent polypropylene sheet 11.

The thickness of the resin layer 33 after being dried is preferably in a range from 0.01 µm to 3 µm, more preferably in a range from 0.08 µm to 0.5 µm. When the thickness is less than 0.01 µm, sufficient ink-adhesion may not be obtained. On the other hand, when the thickness of the resin layer 33 is greater than 3 µm, the resin layer may become sticky to possibly cause blocking.

The resin layer 33 laminated under the above conditions has a tensile-rupture elongation in a range from 150% to 900%, preferably in a range from 200% to 850%, especially preferably in a range from 300% to 750%.

When the tensile-rupture elongation of the resin layer 33 is less than 150%, the resin layer 33 cannot follow the elongation of the polypropylene layer 31 during the thermoforming to cause cracks, which results in cracking and/or peeling of the print layer 32. The tensile-rupture elongation of exceeding 900% is not favorable because the water resistance deteriorates.

The tensile-rupture elongation can be measured using a 150 µm-thick sample by a method according to JIS K7311.

The softening point of the resin layer 33 is in a range from 50 to 180 degrees C., preferably in a range from 90 to 170 degrees C., especially preferably in a range from 100 to 165 degrees C.

The softening point of the resin layer 33 lower than 50 degrees C. is not favorable, because the strength of the resin layer 33 at normal temperature is insufficient to cause cracking and/or peeling of the print layer 32. When the softening point is greater than 180 degrees C., the resin layer 33 is not sufficiently softened during the thermoforming process to generate cracking on the resin layer 33 and cause cracking and/or peeling on the print layer 32.

It should be noted that the softening point is measured as a flow-start temperature using a high-expression flow tester.

The print layer 32 is adjacent to the resin layer 33.

The same printing method as that in the first exemplary embodiment is applicable in the second exemplary embodiment. For instance, when a screen printing is applied, an ink that is excellent in stretching during a molding process is preferably usable, examples of which include, though not exhaustive, FM3107 high-concentration white and SIM3207 high-concentration white manufactured by JUJO CHEMICAL CO., LTD.

At least a part of the molding 3A having been shaped into a predetermined shape is elongated.

Specifically, elongation ratio of the greatly deformed portion is 150% or more, preferably in a range from 180% to 500%, especially preferably in a range from 200% to 400% to exhibit a complicated shape. Even when at least a part of the molding is molded to have a complicated shape (i.e. having 150% or more of the elongation ratio), the transparent polypropylene layer 31 is not whitened and it is expected that the print layer 32 is kept from being cracked or peeled off.

When the elongation ratio is 150% or less, the deformation rate is small enough for the other material not to be whitened and a desired complicated shape cannot be provided. When the elongation ratio exceeds 800%, the transparent polypropylene layer 31 may be whitened and/or the print layer 32 may be cracked or peeled off. Accordingly, the elongation ratio is preferably 800% or less.

The presence of the whitening can be checked from an outside of, for instance, a transparent molded article that is painted black on an inside thereof. When the transparent molded article is whitened, the black paint is seen slightly white. On the other hand, when the transparent molded article is not whitened, the black color is clearly observable. The elongation ratio can be controlled by, for instance, setting the conditions of thermoforming (e.g. heating temperature during the thermoforming, die temperature) and/or according to die design.

In addition, in the greatly elongated part, a film-thickness ratio (B/A) of a thickness B of the rapidly-cooled transparent polypropylene sheet after being molded to a thickness A of the rapidly-cooled transparent polypropylene sheet after being molded is 0.8 or less, preferably in a range from 0.01 to 0.75, especially preferably in a range from 0.05 to 0.7. Even when the molding is formed into a complicated shape, at which the elongation caused by a deformation of the non-planar molded part is large enough to exhibit the film-thickness ratio (B/A) of 0.8 or less, the transparent polypropylene layer 31 is kept from being whitened and it is expected that the print layer 32 is kept from being cracked or peeled off.

When the film-thickness ratio of the molding is greater than 0.8, the partial deformation is small enough for the other material not to be whitened and a desired complicated shape cannot be provided. When the film-thickness ratio exceeds 0.01, the transparent polypropylene layer 31 may be whitened and/or the print layer 32 may be cracked or peeled off. Accordingly, the film-thickness ratio is preferably 0.01 or less.

The film-thickness ratio can be controlled according to the conditions during the thermoforming process and the design of a molding die.

When the molding 3A is formed into a non-planar shape, a surface area ratio (Y/X) of a surface area Y of the post-molded rapidly-cooled transparent polypropylene sheet to a surface area X of the pre-molded rapidly-cooled transparent polypropylene sheet is in a range from 1.5 to 10, preferably in a range from 1.7 to 5, especially preferably in a range from 2 to 4. Even when the molding is formed into a complicated shape, at which the elongation caused by a deformation of the non-planar molded part is large enough to exhibit the surface area ratio (Y/X) in a range from 1.5 to 10, the transparent polypropylene layer 31 is kept from being whitened and it is expected that the print layer 32 is kept from being cracked or peeled off.

When the surface area ratio of the molding is greater than 1.5, the partial deformation is small enough even for the other material not to be whitened and a desired complicated shape cannot be provided. On the other hand, when the surface area ratio exceeds 5, the transparent polypropylene layer 31 may be whitened and/or the print layer 32 may be cracked or peeled off.

The surface area of, for instance, a cube and a rectangular parallelepiped can be calculated by measuring a depth and lengths of the respective sides using a caliper gauge. When a surface area of a molding having a profile (e.g. a curve) difficult to be calculated from measurements is to be measured, a three-dimensional scanner (e.g. non-contact three-dimensional digitizer) can be used. The surface area ratio can be controlled according to the conditions during the thermoforming process and the design of a molding die.

Manufacture of Molding

The molding 3A according to the second exemplary embodiment is manufactured in the same manner in manufacturing the molding 3 according to the first exemplary embodiment.

The manufactured rapidly-cooled transparent polypropylene sheet 11 is, for instance, coated with a polyurethane resin using a gravure coater, a kiss coater, a bar coater and the like and drying the polyurethane resin at 80 degrees C. for one minute, whereby the resin layer 33 is laminated on one side of the rapidly-cooled transparent polypropylene sheet 11.

The thickness of the resin layer 33 after being dried is preferably in a range from 0.01 µm to 3 µm, more preferably in a range from 0.08 µm to 0.5 µm. When the thickness is less than 0.01 µm, sufficient ink-adhesion may not be obtained. On the other hand, when the thickness of the resin layer 33 is greater than 3 µm, the resin layer may become sticky to possibly cause blocking.

Further, the print layer 32 is formed at a predetermined position on a side of the resin layer 33 opposite the side thereof facing the rapidly-cooled transparent polypropylene sheet 11 using, for instance, FM3107 high-density white with a T-250 mesh (polyester mesh) (when screen printing is used) and drying the print layer at 60 degrees C. for 60 minutes to provide the resin sheet.

Subsequently, the resin sheet is heated to 145 degrees C. (surface temperature) using an infrared heater and is pressed onto a die by vacuum or a compressed air to be cooled, thereby being thermoformed into a predetermined shape to provide the molding 3A.

The manufactured molding 3A is disposed in a predetermined die, in which a molten resin for the base is injected to provide the molded article provided with the molding 3A at a part of the surface thereof in an insert molding. The conditions for the injection molding (e.g. resin temperature, injection pressure and cooling details) can be appropriately selected according to the size of the molding and the like. However, the injection molding is usually performed approximately under the conditions of an injection temperature in a range from 180 to 250 degrees C., an injection pressure in a range from 5 MPa to 120 MPa, and a cooling die temperature in a range from 20 to 90 degrees C.

Advantage of Second Exemplary Embodiment

According to the second exemplary embodiment, the non-planar molding 3A is formed by using a resin sheet having a laminated structure including the polypropylene layer 31 obtained by rapidly cooling a molten resin and the resin layer 33 made of a polyurethane resin having tensile-rupture elongation in a range from 150% to 900% and a softening point in a range from 50 to 180 degrees C. The non-planar molding 3A is formed using a resin sheet having a laminate structure of: the rapidly-cooled transparent polypropylene sheet 11 having 4 µm or less of an average spherulite radius, 600 or less per mm$^2$ of an average spherulite number in a cross section of the sheet, 0.896 g/cm$^3$ or less of the solid density, less than 90 J/g of fusion enthalpy ΔH of the maximum endothermic peak in a differential scanning calorimetry (DSC) curve, 90% or more of glossiness on at least one side, 1 J/g or more of an exothermic peak at a low-temperature side of the maximum endothermic peak; and the resin layer 33 having the tensile-rupture elongation in a range from 150 to 900% and the softening point in a range from 50 to 180 degrees C.

Accordingly, even when the resin sheet is formed into a complicated shape, the elongation during the forming process is absorbed by the resin layer 33 and is not likely to be transferred to the print layer 32, so that the print layer 32 is kept from being cracked or peeled off. Accordingly, even with the molding 3A having a complicated shape, the polypropylene layer 31 is not whitened, whereby a favorable appearance can be provided to the molding 3A and to a molded article having the molding 3A at a part thereof.

In the second exemplary embodiment, the resin layer 33 is formed of a resin obtained by reacting diisocyanate, a high-molecular-weight polyol and a chain extender, in which the high-molecular-weight polyol is selected from polyether polyol and polycarbonate polyol.

Accordingly, even when the resin sheet is shaped into a complicated non-planar shape, the layer structure can favorably conform to the elongation of the polypropylene layer 31, so that the print layer 32 is kept from being cracked or peeled off and favorable appearance can be provided.

Especially, since the resin layer 33 is formed of polyurethane resin, the print layer 32 is further unlikely to be cracked or peeled off. In addition, the resin layer 33 can be easily provided using a coating process and the like.

In the second exemplary embodiment, the molding 3A is provided with the print layer 32.

Accordingly, even when the molding is formed into a complicated shape after the resin layer 33 is printed to provide the print layer 32, the print layer 32 is kept from being peeled off or cracked and the polypropylene layer 31 of the rapidly-cooled transparent polypropylene sheet 11 is not whitened, thereby providing an excellent appearance even with a complicated shape.

Further, in the first exemplary embodiment, since the molded article is provided at a part thereof with the molding 3A formed into a complicated shape without the polypropylene layer 31 being whitened, the molded article 1 can provide excellent appearance to a wide variety of exterior components and can enhance versatility thereof.

In addition, since the molded article provided at least a part thereof with the molding 3A is formed using an insert molding process, even an exterior component with a complicated shape can be easily produced with a favorable appearance.

Modification(s)

Best mode for carrying out the invention has been described in the above. However, it should be understood that the scope of the invention is not limited thereto. In other words, though the present invention has been described mainly with reference to specific embodiments, it should be appreciated that those skilled in the art can freely modify the material, quantity and other details of the above-described embodiment(s) without departing from the technical idea and object of the invention.

Accordingly, the above description relating to material, quantity and the like are only for the convenience of facilitating the understanding of the present invention and are not for limiting the scope of the invention, so that referencing a component with a part of or the entirety of the limitation regarding the material thereof and the like is also included in the scope of the present invention.

For instance, it is not necessary that the molding is insert-molded but various methods capable of providing a molding to a part of the base material are usable, the methods including an in-mold molding process in which the resin sheet is shaped with a pressure of an injected molding resin, a process in which pre-fabricated molded article having a complicated shape is covered with the resin, and transfer molding in which a sheet is removed after being coated to leave only an ink.

Further, it is not necessary that only one molding is provided on the surface of the molded article, but a plurality of molded article may be provided.

Though a thermoplastic resin adapted to be insert-molded is exemplified as a material of the base, the base may alternatively be provided by various materials including a photo-curable resin (e.g. ultraviolet-curing acrylic resin) that is curable by light, ultraviolet, heat or the like, or a polymerization curable resin (e.g. epoxy resin) that is polymerized to be cured using a polymerization initiator.

In the first exemplary embodiment, it is not necessary that the molding 3 is provided by forming the resin sheet using the rapidly-cooled transparent polypropylene sheet 11 constituting the polypropylene layer 31, applying a print thereon to provide the print layer 32, and molding the resin sheet into a predetermined shape. A molding obtained by molding the rapidly-cooled transparent polypropylene sheet 11 may be applied with a print to provide the print layer 32.

In order to form the molding 3 from the resin sheet, a vacuum molding process in which the sheet is heated using an infrared heater and a space between a die and the sheet is vacuumized to bring the sheet into conformity with the die with an atmospheric pressure, a vacuum pressure molding process in which the sheet is pressed by compressed air when the sheet is brought into conformity with the die during the vacuum molding process, or the like may be used. Among the above, the vacuum pressure molding process is preferable because the sheet is easily shaped into a complicated shape.

Though the molded article 1 in the first exemplary embodiment exemplarily includes a three-layer structure including two layers of the moldings 3, the molded article 1 may have two-layer structure without the print layer, or a multilayer structure including four or more layers. Specifically, the molded article may have the following layer structures.

(1A) polypropylene layer (rapidly-cooled transparent polypropylene sheet 11) 31/base 2
(1B) polypropylene layer 31/print layer 32/base 2
(1C) print layer 32/polypropylene layer 31/base 2
(1D) polypropylene layer 31/print layer 32/polypropylene layer 31/base 2
(1E) print layer 32/polypropylene layer 31/print layer 32/base 2
(1F) polypropylene layer 31/print layer 32/metal thin film/base 2

According to the layer structure (1B), the polypropylene layer 31 located on the surface protects the print layer 32, whereby the favorable appearance of the print layer 32 can be stably provided for a long time. According to the layer structure (1C), even when the print layer 32 is weak to heat applied, for instance, during the insert molding process, the print layer 32 is kept from being modified by the heat, whereby favorable print layer 32 can be provided. According to the layer structure (1E), excellent appearance can be provided by the plurality of print layers 32. According to the layer structure (1F), excellent appearance can be provided by the reflective metal thin film layer (e.g. aluminum layer). It should be noted that the other layer may be additionally provided in the above exemplary layer structures.

In the second exemplary embodiment, it is not necessary that the molding 3A is provided by forming the resin sheet using the rapidly-cooled transparent polypropylene sheet 11 constituting the polypropylene layer 31, layering the resin layer 33 and the print layer 32 on the polypropylene sheet 11, and molding the resin sheet into a predetermined shape. The resin layer 33 and the print layer 32 may be provided on a molding obtained by molding the rapidly-cooled transparent polypropylene sheet 11. Alternatively, the print layer 32 may be provided to a molding obtained by molding a resin sheet formed by providing the resin layer 33 on the rapidly-cooled transparent polypropylene sheet 11.

In order to form the molding 3A from the resin sheet, a vacuum molding process in which the sheet is heated using an infrared heater and a space between a die and the sheet is vacuumized to bring the sheet into conformity with the die with an atmospheric pressure, a vacuum pressure molding process in which the sheet is pressed by compressed air when the sheet is brought into conformity with the die during the vacuum molding process, or the like may be used. Among the above, the vacuum pressure molding process is preferable because the sheet is easily shaped into a complicated shape.

Though the molded article in the second exemplary embodiment exemplarily includes a three-layer structure including two layers of the moldings 3A, the moldings 3A may have two-layer structure without the print layer, or a multilayer structure including four or more layers. Specifically, the molding may have the following layer structures.

(2A) polypropylene layer (rapidly-cooled transparent polypropylene sheet 11) 31/resin layer 33/base
(2B) polypropylene layer 31/resin layer 33/print layer 32/base
(2C) print layer 32/resin layer 33/polypropylene layer 31/base
(2D) print layer 32/resin layer 33/polypropylene layer 31/resin layer 33/print layer 32/base
(2E) polypropylene layer 31/resin layer 33/print layer 32/polypropylene layer 31/base
(2F) polypropylene layer 31/resin layer 33/print layer 32/metal thin film layer/base According to the layer structure (2B), the polypropylene layer 31 located on the surface protects the print layer 32, whereby the favorable appearance of the print layer 32 can be stably provided for a long time. According to the layer structure (2C), even when the print layer 32 is weak to heat applied, for instance, during the insert molding process, the print layer 32 is kept from being modified, whereby favorable print layer 32 can be provided. According to the layer structure (2D), excellent appearance can be provided by the plurality of print layers 32. According to the layer structure (2F), excellent appearance can be provided by the reflective metal thin film layer (e.g. aluminum layer). It should be noted that the other layer may be additionally provided in the above exemplary layer structures.

EXAMPLE(S)

The invention will be described with reference to examples.

It should be noted that the scope of the invention is not limited to the following examples and comparatives.

Example 1A

The rapidly-cooled transparent polypropylene sheet 11 was manufactured using a manufacturing apparatus shown in FIG. 3 under the following conditions.
Diameter of extruder: 90 mm
Width of T-die 12: 800 mm
Polypropylene (PP): product name Prime Polypro E-103WA manufactured by Prime Polymer Co., Ltd. (melt flow index 3 g/10 min, homopolypropylene)
Drawing speed of the rapidly-cooled transparent polypropylene sheet 11: 10 m/min
Surface temperature of each of the fourth cooling roller 16 and the metal endless belt 17: 14 degrees C.
Temperature of cooling water: 8 degrees C.
Sprayed cooling water: 200 liter/min Example 2A Except for using a random polypropylene (product name Prime Polypro F-744NP manufactured by Prime Polymer Co., Ltd.) as polypropylene, the rapidly-cooled transparent polypropylene sheet 11 was obtained in the same manner as in Example 1A.

Example 3A

Except for adding 3 wt % of petroleum resin to the homopolypropylene of Example 1A, the rapidly-cooled transparent polypropylene sheet 11 was obtained in the same manner as in Example 1A.

Comparative 1A

Using 0.3% of nucleating agent (GEL ALL MD (manufactured by New Japan Chemical Co., Ltd.)) added to the homopolypropylene in Example 1A, melt web was extruded from a T-die extruder. Then, air was blown to a side of the extruded melt web opposite a side in contact with a cooling roller to cool the melt web (air knife method) to obtain a polypropylene sheet.

Comparative 2A

Except for using a mixture of the homopolypropylene of Example 1A and 0.3% of the nucleating agent of Comparative 1A, a polypropylene sheet was obtained in the same manner as in Example 1A.

Comparative 3A

Using the homopolypropylene of Example 1A, stress was relaxed until the melt web from the T-die became transparent by controlling the extruded amount from the T-die extruder. Then, the extruded melt web was delivered through a water bath to be cooled (water-cooling method), and the obtained polypropylene sheet was annealed.

Test Examples

With regard to the rapidly-cooled polypropylene sheets according to different rapid cooling conditions in the above Examples 1A to 3A and Comparatives 1A to 3A, thickness, average spherulite radius, spherulite number per a unit area, presence/absence of DSC exothermic peak, fusion enthalpy, surface glossiness, and elongation modulus were measured. The results are shown in Table 1.

The resin sheet was heated using an infrared heater so that the surface temperature of the resin sheet became 145 degrees C. Then, the resin sheet was thermoformed by pressing the resin sheet to a die by vacuum and blowing compressed air to cool the resin sheet, the die providing a surface area ratio (Y/X) of 2.42 for a surface area Y of the resin sheet after being molded and a surface area X of the resin sheet before being molded. The elongation ratio was calculated based on a measurement of a length of a pre-printed 1-mm square grid pattern after the sheet was molded. The film-thickness ratio (B/A) of the thickness A of the pre-molded sheet to the thickness B of the post-molded sheet was calculated based on measurements of the thicknesses of the sheets using a micrometer. The presence/absence of the whitening was checked by coating an inside of a transparent molded article with a black paint and visually checking from an outside of the molded article. The whitening of the molded article was rated A when the black color could be clearly seen and was rated B when the black color appeared slightly white. Results are shown in Table 1.

Diameter of extruder: 90 mm
Width of T-die 12: 800 mm
Polypropylene (PP): product name Prime Polypro E-103WA manufactured by Prime Polymer Co., Ltd. (melt flow index 3 g/10 min, homopolypropylene)
Drawing speed of the rapidly-cooled transparent polypropylene sheet 11: 10 m/min
Surface temperature of the fourth cooling roller 16 and the metal endless belt 17: 14 degrees C.
Temperature of cooling water: 8 degrees C.
Sprayed cooling water: 200 liter/min After applying a corona treatment on a side of the obtained rapidly-cooled transparent polypropylene sheet 11, the following resin material was coated at 0.5 g/m² using a bar coater and was dried for one minute at 80 degrees C. to provide the resin layer 33.

Resin material: product name HYDRAN WLS-213, manufactured by DIC Corporation.

Example 2B

Except for using a random polypropylene (product name Prime Polypro F-744NP manufactured by Prime Polymer Co., Ltd.) as polypropylene, the resin sheet was obtained in the same manner as in Example 1B.

Example 3B

Except for using a mixture of the homopolypropylene of Example 1B and 3 wt % of petroleum resin, the resin sheet was obtained in the same manner as in Example 1B.

TABLE 1

| | | Example 1A | Example 2A | Example 3A | Comparative 1A | Comparative 2A | Comparative 3A |
|---|---|---|---|---|---|---|---|
| PP Layer | Material | polypropylene (homo-PP) | propylene-etylene ramdom copolymer (ramdom PP) | polypropylene (homo-PP) + petroleum resin 3 wt % | polypropylene (homo-PP) + nucleating agent (air-knife method) | polypropylene (homo-PP) + nucleating agent | polypropylene (homo-PP) (water-cooling method) |
| | MFR (g/10 min) | 3.0 | 3.0 | 3.0 | 3.0 | 3.0 | 3.0 |
| | Thickness (μm) | 300 | 300 | 300 | 300 | 300 | 300 |
| | Average spherulite radius (μm) | 3 | 3 | 3 | 5 | 5 | 3 |
| | Spherulite density (number/mm²) | 100 | 90 | 100 | 2000 | 2000 | 100 |
| | Exothermic peak | Yes | Yes | Yes | No | No | No |
| | Fusion enthalpy (J/g) | 83 | 42 | 81 | 90 | 89 | 92 |
| | Internal haze (%) | 2.1 | 1.3 | 1.7 | 9.5 | 5.1 | 3.8 |
| | Surface glossiness (%) | 141 | 150 | 145 | 73 | 130 | 100 |
| | Elongation modulus (Mpa) | 1150 | 850 | 1400 | 1800 | 2000 | 1800 |
| | Density (g/cm³) | 0.888 | 0.886 | 0.886 | 0.901 | 0.901 | 0.900 |
| Molding | Elongation ratio (%) | 326 | 313 | 315 | 283 | 280 | 276 |
| | Surface area ratio | | | 2.42 | | | |
| | Film thickness ratio | 0.17 | 0.16 | 0.16 | 0.18 | 0.18 | 0.17 |
| | Whitening | A | A | A | B | B | B |

As shown in Table 1, the polypropylene sheet according to the invention can avoid whitening after being molded. Thus, the polypropylene sheet of the invention is kept from deterioration of appearance due to whitening even with a complicated shape and provides favorably decorative molding.

Example 1B

The rapidly-cooled transparent polypropylene sheet 11 was manufactured using a manufacturing apparatus shown in FIG. 3 under the following conditions.

Example 4B

Except for using HYDRAN WLS-202 manufactured by DIC Corporation as the resin material for the resin layer 33 in Example 1B, the resin sheet was obtained in the same manner as in Example 1B.

Comparative 1B

Using 0.3% of nucleating agent (GEL ALL MD (manufactured by New Japan Chemical Co., Ltd.)) added to the homopolypropylene in Example 1B, melt web was extruded from a T-die extruder. Then, air was blown to a side of the extruded melt web opposite a side in contact with a cooling roller to cool the melt web (air knife method) to obtain a polypropylene sheet.

Comparative 2B

Except for using a mixture of the homopolypropylene of Example 1B and 0.3% of the nucleating agent of Comparative 1B, a polypropylene sheet was obtained in the same manner as in Example 1B.

Comparative 3B

Using the homopolypropylene of Example 1B, stress was relaxed until the melt web from the T-die became transparent by controlling the extruded amount from the T-die extruder. Then, the extruded melt web was delivered through a water bath to be cooled (water-cooling method), and the obtained polypropylene sheet was annealed.

Comparative 4B

The homopolypropylene applied solely with the corona treatment in Example 1B was used.

Comparative 5B

Except for using HYDRAN APX-101H manufactured by DIC Corporation as the resin material for the resin layer 33 in Example 1B, the resin sheet was obtained in the same manner as in Example 1B.

Text Examples

With regard to the rapidly-cooled polypropylene sheets according to different rapid cooling conditions in the above Examples 1B to 4B and Comparatives 1B to 5B, thickness, average spherulite radius, spherulite number per a unit area, presence/absence of DSC exothermic peak, fusion enthalpy, internal haze, surface glossiness, and elongation modulus were measured. The results are shown in Table 2.

The resin sheet was heated using an infrared heater so that the surface temperature of the resin sheet became 145 degrees C. Then, the resin sheet was thermoformed by pressing the resin sheet to a die by vacuum and blowing compressed air to cool the resin sheet, the die providing a surface area ratio (Y/X) of 2.42 for a surface area Y of the resin sheet after being molded and a surface area X of the resin sheet before being molded. The elongation ratio was calculated based on a measurement of a length of a pre-printed 1-mm square pattern after the sheet was molded. The film-thickness ratio (B/A) of the thickness A of the pre-molded sheet to the thickness B of the post-molded sheet was calculated based on measurements of the thicknesses of the sheets using a micrometer. The whitening was evaluated by visually checking a first side of a thermally molded article painted with a black paint from a second side opposite the first side. The whitening of the molded article was rated A when the black color could be clearly seen and was rated B when the black color appeared slightly white. Results are shown in Table 2.

Further, presence of cracking of the print layer 32 on the thermally molded product was visually checked. When there was no cracking, one-hundred 1-mm square grids peeling test was conducted using an adhesive cellophane tape to determine whether or not the print layer 32 was peeled off from the resin layer 33.

Evaluation of Print Layer 32
A: No peeling and cracking
B: There was peeling and/or cracking

TABLE 2

| | | Example 1B | Example 2B | Example 3B | Example 4B | Comparative 1B | Comparative 2B | Comparative 3B | Comparative 4B | Comparative 5B |
|---|---|---|---|---|---|---|---|---|---|---|
| PP Layer | Material | polypropylene (homo PP) | propylene-ethylene random copolymer (random PP) | polypropylene (homo PP) + petroleum resin 3 wt % | polypropylene (homo PP) | polypropylene (homo PP) + nucleating agent (air-knife method) | polypropylene (homo PP) + nucleating agent | polypropylene (homo PP) (water-cooling method) | polypropylene (homo PP) | polypropylene (homo PP) |
| | MFR (g/10 min) | 3.0 | 3.0 | 3.0 | 3.0 | 3.0 | 3.0 | 3.0 | 3.0 | 3.0 |
| | Thickness (μm) | 300 | 300 | 300 | 300 | 300 | 300 | 300 | 300 | 300 |
| | Average spherulite radius (μm) | 3 | 3 | 3 | 3 | 5 | 5 | 3 | 3 | 3 |
| | Spherulite density | 100 | 90 | 100 | 100 | 2000 | 2000 | 100 | 100 | 100 |
| | Exothermic peak | Yes | Yes | Yes | Yes | No | No | No | Yes | Yes |
| | Fusion enthalpy (J/g) | 83 | 42 | 81 | 83 | 90 | 89 | 92 | 83 | 83 |
| | Internal haze (%) | 2.1 | 1.3 | 1.7 | 2.1 | 9.5 | 5.1 | 3.8 | 2.1 | 2.1 |
| | Surface glossiness | 141 | 150 | 145 | 141 | 73 | 130 | 100 | 141 | 141 |
| | Elongation modulus (Mpa) | 1150 | 850 | 1400 | 1150 | 1800 | 2000 | 1800 | 1150 | 1150 |
| | Density (g/cm$^3$) | 0.888 | 0.886 | 0.886 | 0.888 | 0.901 | 0.901 | 0.900 | 0.888 | 0.888 |

TABLE 2-continued

| | | Example 1B | Example 2B | Example 3B | Example 4B | Comparative 1B | Comparative 2B | Comparative 3B | Comparative 4B | Comparative 5B |
|---|---|---|---|---|---|---|---|---|---|---|
| Resin Layer | Material | urethane resin | urethane resin | urethane resin | urethane resin | urethane resin | urethane resin | urethane resin | — | urethane resin |
| | Polyol | polycarbonate | polycarbonate | polycarbonate | polyether | polycarbonate | polycarbonate | polycarbonate | — | polyester |
| | tensile-ruptture elongation (%) | 400 | 400 | 400 | 600 | 400 | 400 | 400 | — | 430 |
| | Softening point (° C.) | 160 | 160 | 160 | 160 | 160 | 160 | 160 | — | 180 to 200 |
| | Thickness (μm) | 0.5 | 0.5 | 0.5 | 0.5 | 0.5 | 0.5 | 0.5 | — | 0.5 |
| Molding | Elongation ratio (%) | 326 | 313 | 315 | 326 | 283 | 280 | 276 | 326 | 326 |
| | Surface area ratio | | | | | 2.42 | | | | |
| | Film thickness ratio | 0.17 | 0.16 | 0.16 | 0.17 | 0.18 | 0.18 | 0.17 | 0.17 | 0.17 |
| | Whitening | A | A | A | A | B | B | B | A | A |
| Print | Cracking | A | A | A | A | A | A | A | B | B |
| | Adhesion (grid peeling) | 100/100 | 100/100 | 100/100 | 100/100 | 100/100 | 100/100 | 100/100 | 0/100 | 30/100 |

As shown in Table 2, the print layer 33 is kept from being cracked or peeled off even after the sheet is formed into a complicated shape. It is thus understood that the sheet of the exemplary embodiment provides a favorable decorative molding that could not be achieved with the use of a conventional polypropylene sheet.

The invention claimed is:

1. A laminate comprising:
a transparent polypropylene layer (A) of a polypropylene resin; and
a resin layer (B) of a polyurethane resin, the polyurethane resin having a tensile-rupture elongation in a range from 150% to 900% and a softening point in a range from 50 degrees C. to 180 degrees C., the transparent polypropylene layer (A) and the resin layer (B) being laminated with each other, wherein
the transparent polypropylene layer (A) has 1 J/g or more of an exothermic peak at a low-temperature side of the maximum endothermic peak in a differential scanning calorimetry (DSC) curve, and
the transparent polypropylene layer (A) is formed by rapidly cooling a molten resin of the polypropylene resin.

2. The laminate according to claim 1, wherein
the molten resin is rapidly cooled using a cooling roller whose surface temperature is kept in a range from a dew point to 50 degrees C. to form the transparent polypropylene layer (A).

3. The laminate according to claim 1, wherein
the resin layer (B) is made of a resin obtained by reacting at least diisocyanate, a high-molecular-weight polyol and a chain extender, the high-molecular-weight polyol being selected from polyether polyol and polycarbonate polyol.

4. The laminate according to claim 1, wherein
at least a part of a side of the resin layer (B) opposite to a side adjacent to the transparent polypropylene layer (A) is applied with printing.

5. A laminate comprising:
a transparent polypropylene layer (A) of a polypropylene resin; and
a resin layer (B) of a polyurethane resin, the polyurethane resin having a tensile-rupture elongation in a range from 150% to 900% and a softening point in a range from 50 degrees C. to 180 degrees C., the transparent polypropylene layer (A) and the resin layer (B) being laminated with each other, wherein
the transparent polypropylene layer (A) has 4 μm or less of an average spherulite radius, 600 or less per $mm^2$ of an average spherulite number in a cross section of the sheet, 0.896 $g/cm^3$ or less of a solid density, less than 90 J/g of a fusion enthalpy ΔH of a maximum endothermic peak in a differential scanning calorimetry (DSC) curve, 90% or more of a glossiness on at least one side, and 1 J/g or more of an exothermic peak at a low-temperature side of the maximum endothermic peak in a differential scanning calorimetry (DSC) curve.

* * * * *